(12) United States Patent
Vande Sande

(10) Patent No.: US 10,408,263 B2
(45) Date of Patent: Sep. 10, 2019

(54) MAGNETIC BEARING AND METHOD FOR MOUNTING A FERROMAGNETIC STRUCTURE AROUND A CORE OF A MAGNETIC BEARING

(71) Applicant: Atlas Copco Airpower, Naamloze Vennootschap, Wilrijk (BE)

(72) Inventor: Hans Vande Sande, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 522 days.

(21) Appl. No.: 14/398,833

(22) PCT Filed: May 3, 2013

(86) PCT No.: PCT/BE2013/000023
§ 371 (c)(1),
(2) Date: Nov. 4, 2014

(87) PCT Pub. No.: WO2013/170322
PCT Pub. Date: Nov. 21, 2013

(65) Prior Publication Data
US 2015/0137642 A1 May 21, 2015

(30) Foreign Application Priority Data

May 16, 2012 (BE) .................... 2012/0328

(51) Int. Cl.
*H02K 7/09* (2006.01)
*H01F 3/02* (2006.01)
(Continued)

(52) U.S. Cl.
CPC ...... *F16C 32/0465* (2013.01); *F16C 32/0461* (2013.01); *F16C 32/0463* (2013.01);
(Continued)

(58) Field of Classification Search
CPC ............ H02K 1/04; H02K 1/14; H02K 1/141; H02K 1/143; H02K 1/148; H02K 7/09; H01F 3/02; H01F 3/10; H01F 41/02
(Continued)

(56) References Cited

U.S. PATENT DOCUMENTS 4,353,602 A 10/1982 Habermann
4,918,345 A 4/1990 Vaillant De Guelis et al.
(Continued)

FOREIGN PATENT DOCUMENTS

CN 1737388 A 2/2006
DE 10216421 A1 10/2003
(Continued)

OTHER PUBLICATIONS

Buckner et al., "Control System for Inside-Out Configuration Magnetic Bearings".
(Continued)

*Primary Examiner* — Quyen P Leung
*Assistant Examiner* — Minki Chang
(74) *Attorney, Agent, or Firm* — Bacon & Thomas, PLLC

(57) ABSTRACT

Magnetic bearing that is provided with a radial actuator part and an axial actuator part, whereby the aforementioned radial actuator part comprises a laminated stator stack that is provided with a stator yoke, wherein the stator yoke is linked to a closed ferromagnetic structure that surrounds the stator yoke.

6 Claims, 7 Drawing Sheets

(51) Int. Cl.
*H01F 3/10* (2006.01)
*F16C 32/04* (2006.01)
*H01F 41/02* (2006.01)

(52) U.S. Cl.
CPC .......... *F16C 32/0485* (2013.01); *H01F 3/02* (2013.01); *H01F 3/10* (2013.01); *H01F 41/02* (2013.01); *H02K 7/09* (2013.01); *F16C 2300/02* (2013.01); *H01F 2003/106* (2013.01); *Y10T 29/4902* (2015.01)

(58) Field of Classification Search
USPC .... 310/216.008, 216.009, 216.011, 216.015, 310/216.044, 90.5
See application file for complete search history.

(56) References Cited

U.S. PATENT DOCUMENTS

| | | | |
|---|---|---|---|
| 4,920,291 A | | 4/1990 | McSparran |
| 5,514,924 A | * | 5/1996 | McMullen .......... F16C 32/0485 310/90.5 |
| 6,268,674 B1 | | 7/2001 | Takahashi |
| 6,359,357 B1 | | 3/2002 | Blumenstock |
| 6,727,617 B2 | | 4/2004 | McCmullen et al. |
| 2003/0001446 A1 | | 1/2003 | Hasegawa et al. |
| 2011/0101808 A1 | | 5/2011 | Kuwata |
| 2012/0212093 A1 | | 8/2012 | Sande |

FOREIGN PATENT DOCUMENTS

| | | |
|---|---|---|
| DE | 102010038791 A1 | 11/2011 |
| EP | 0816701 A1 | 1/1998 |
| JP | 2002-174237 A | 6/2002 |
| JP | 2003-013955 A | 1/2003 |
| JP | 2010-007779 A | 1/2010 |
| WO | 2008/074045 A2 | 6/2008 |
| WO | 2011/054065 A2 | 5/2011 |

OTHER PUBLICATIONS

Imoberdorf et al., "Combined Radial-Axial Magnetic Bearing for a 1 KW, 500,000 RPM Permanent Magnet Machine".
Pichot et al., "Active Magnetic Bearings for Energy Storage Systems for Combat Vehicles".
International Search Report (ISR) dated Jul. 30, 2013, for PCT/BE2013/000023.

* cited by examiner

MAGNETIC BEARING AND METHOD FOR MOUNTING A FERROMAGNETIC STRUCTURE AROUND A CORE OF A MAGNETIC BEARING

BACKGROUND OF THE INVENTION

1. Field of the Invention

The invention relates to magnetic bearings for rotating machines, whereby the bearing presents an integrated radial-axial design and whereby the axial control flux goes through the central opening of a soft magnetic core.

Magnetic bearings provide contactless suspension. Their low friction losses means that they are attractive for high-speed applications. However, the design of high-speed rotating machines is often complex due to rotor-dynamic limitations. In this respect each reduction of the axial length contributes to the rotor-dynamic margin. This property is applied to a maximum in 'combo bearings', i.e. bearings in which the design integrates axial and radial channels into a compact arrangement in which various functional parts are shared.

2. Discussion of the related art

Various examples of combo bearings can be found in patents and the literature. Frequently the path of the axial control flux crosses the central hole of a stack of laminated ferromagnetic material. Examples of this can be found in the following patents or patent applications: U.S. Pat. Nos. 5,514,924; 6,268,674; 6,727,617 which is hereby incorporated by reference; WO 2008/074045; and CN 1737388. Other examples can be found in the literature, such as in the publications of Imoberdorf e. a., Pichot e. a. and Buckner e.a. In combo bearing types as depicted in U.S. Pat. No. 6,359,357 B1 of Blumenstock, the axial control flux does not cross the central hole of a stack of laminated ferromagnetic material.

The performance of the axial channel of a combo bearing can be detrimentally influenced if the path of the axial control flux crosses the central hole of the stack of laminated material, or more generally if a combo bearing contains a section where an electrically conductive path surrounds the control flux. In that case varying control fluxes generate voltages in the surrounding material. These generated voltages cause circulation currents and consequently Joule losses, if the surrounding path is closed and electrically conductive. In fact such a stack of laminated material can be considered as a short-circuited secondary winding of a transformer, in which the axial control coil is the primary winding. The result depends on the frequency: in principle the loss increases with increasing frequency. With a certain axial control current and frequency, the Joule losses reduce the force that can be realised. As a result of this the performance of the axial channel can be affected.

Similar phenomena can occur in the stack of laminated material on which the axial actuator acts. In this case the control flux enters the stack itself, but the physical interpretation remains the same. In U.S. Pat. No. 6,268,674, Takahashi proposes making a series of equally distributed radial cuts in such a stack of laminated material. Of course the lamellae are not cut over their entire thickness, in order to maintain sufficient strength. As a result of this, induced currents remain localised, if the control flux only enters the region of the cut. This technique only provides a solution for reducing the losses in the stack of laminated material concerned. The total control flux is always surrounded by another stator stack.

The international patent application No. WO 2011/054065, describes a method for eliminating eddy currents induced in the stator stack by the axial control field. This is realised by making a cut through each lamella of the stack, and by stacking the lamellae such that the reluctance to magnetic fields within the stack is affected to a minimum. A disadvantage of this method is that the reluctance of the stack to magnetic fields that are caused by radial control coils increases. In addition, as it is known that the coating between the lamellae is not perfectly insulating, and as parts of the assembly can also lead to contact between lamellae, circulation currents can still be observed. Hence additional measures for damping these eddy currents can further improve performance.

SUMMARY OF THE INVENTION

The purpose of the present invention is to provide an alternative way to reduce losses as a result of eddy currents.

To this end the invention concerns a magnetic bearing that is provided with a radial actuator part and an axial actuator part, whereby the radial actuator part is provided with a laminated stator stack provided with a stator yoke, and whereby the stator yoke is linked to a closed ferromagnetic structure that surrounds the stator yoke.

BRIEF DESCRIPTION OF THE DRAWINGS

With the intention of better showing the characteristics of the invention, some preferred embodiments of a magnetic bearing according to the invention are described hereinafter by way of an example, without any limiting nature, with reference to the accompanying drawings, wherein.

DETAILED DESCRIPTION OF THE INVENTION

Figure 1:
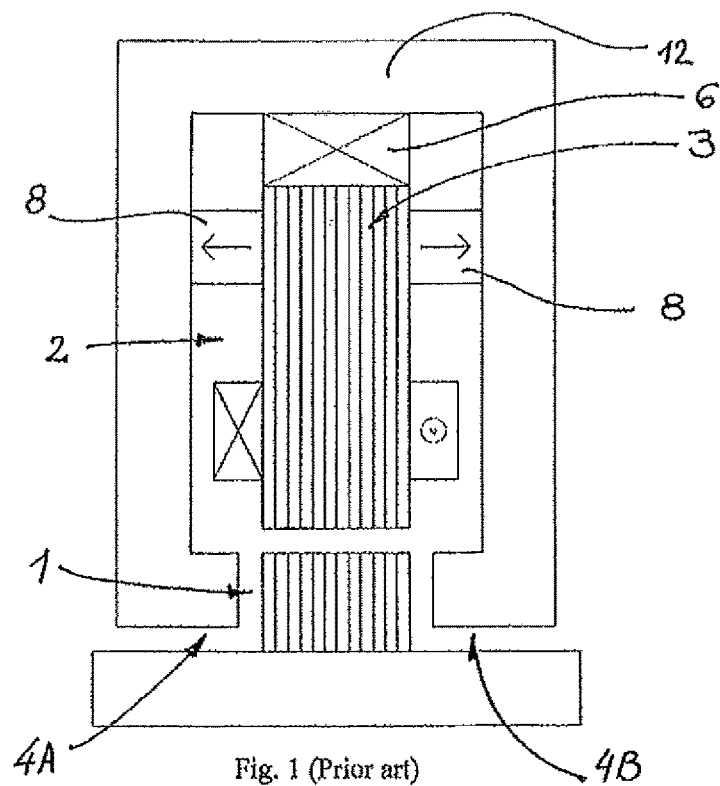
FIGS. 1 to 3 show longitudinal cross-sections of known combo bearings.
Figure 2:
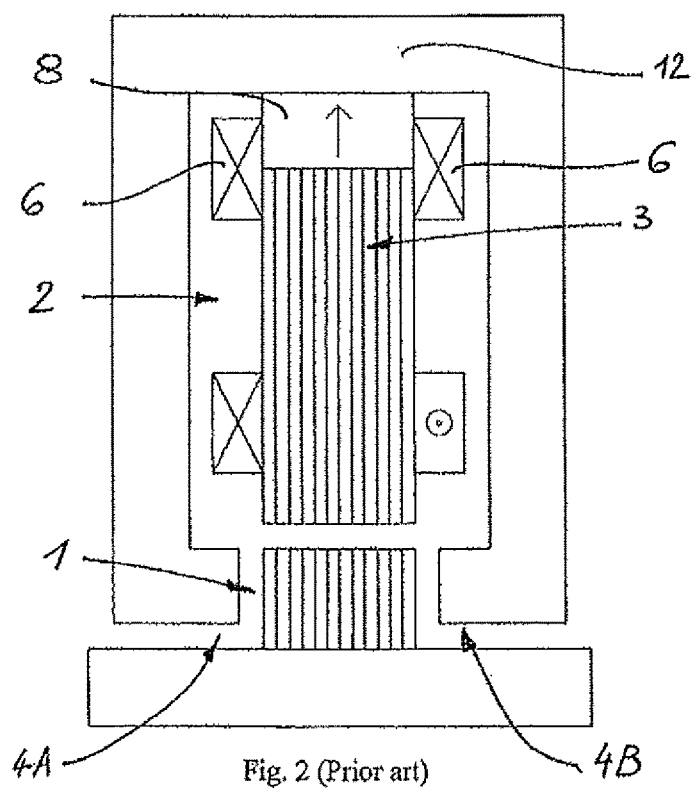
Figure 3:
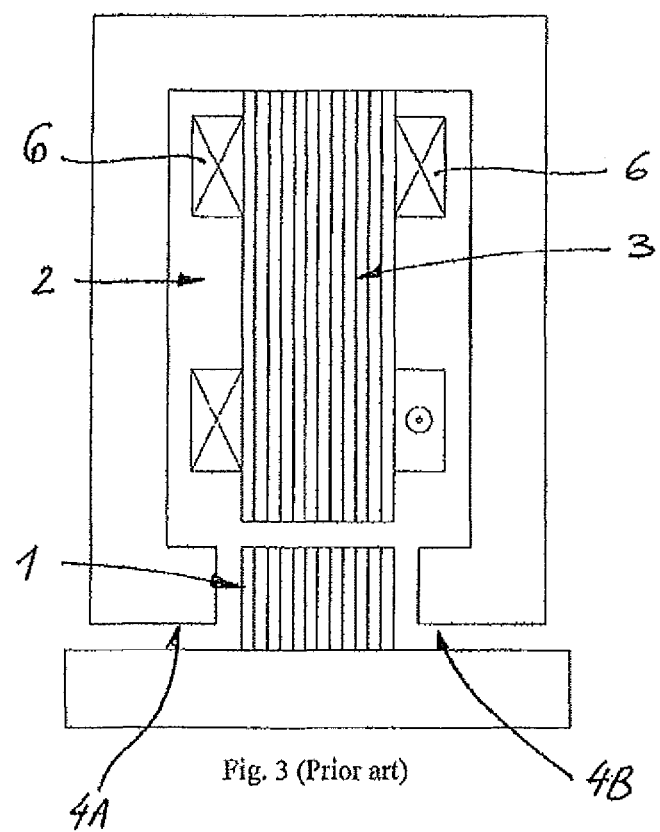
Figure 4:
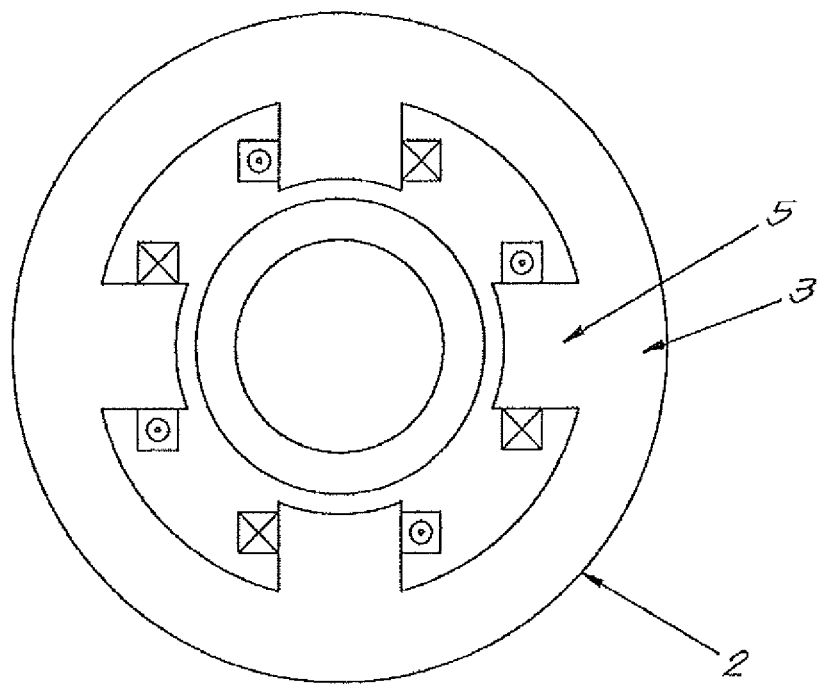
FIGS. 4 and 5 show a radial cross-section of known combo bearings.
Figure 5:
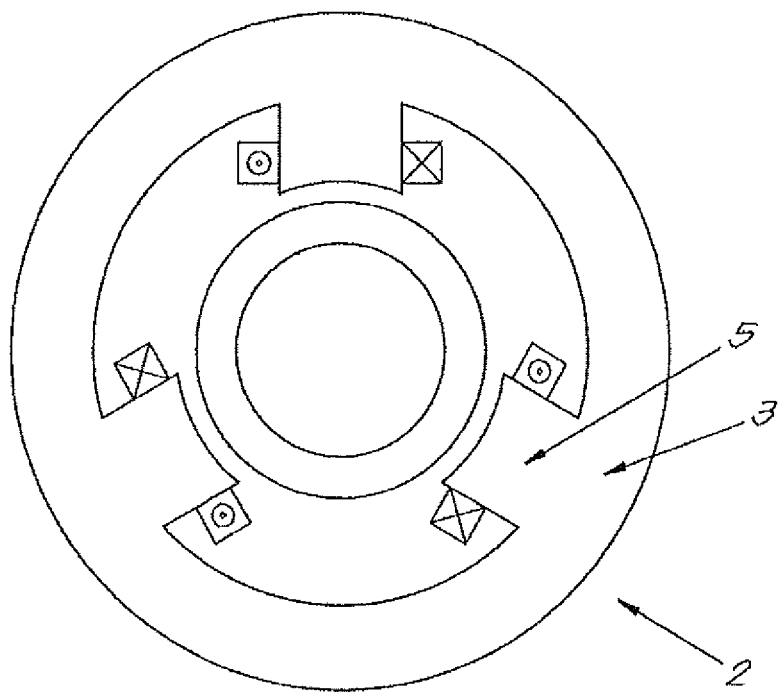

Some longitudinal cross-sections of state-of-the-art combo bearing types are shown in FIGS. 1, 2 and 3. Two possible radial cross-sections of state-of-the-art combo bearing types are shown in FIGS. 4 and 5.

The alternative designs that are shown, are all composed of a laminated rotor stack 1, a laminated stator stack 2, a stator yoke 3, a pole yoke 12, two axial poles 4*a* and 4*b* and at least three radial poles 5.

Axial forces are controlled by an axial control coil 6, whose construction is rotationally symmetrical.

Radial forces are controlled by radial control coils 7 that are wound around the radial poles 5.

If the bias field is not generated by permanent magnets 8, it can be generated by adding a bias current to the axial control current in a certain way or by guiding a bias current through a separate bias coil, which also presents a rotationally symmetrical form and is localised close to the axial control coil 6. The aforementioned bias coil has the same construction as the axial control coil 6, is physically separated from this axial control coil 6, and is in the immediate vicinity of it.

When a current is supplied to the radial control coil 7, a flux begins to flow in the plane of the lamellae of the stator stack 2.

The flux that is generated by a current supplied to the axial control coil 6, flows through the pole yoke 12, then goes into an axial pole 4a, crosses the split to the rotor stack 1, crosses the split to the opposite axial pole 4b and finally returns in the pole yoke 12.

As a result of the foregoing, a time-variable flux crosses the central hole of the stator stack 2, as the axial control current varies over time.

According to the laws of Faraday-Lenz and Ohm, circulation currents are generated in the lamellae of the stator stack 2. Hence, the purpose of the present invention is to provide a damping device for these induced circulation currents.

The impedance that the circulation currents are subject to are primarily determined by the tangential resistance of the lamella stack.

There can be a small inductive contribution, but it is relatively limited. The present invention concerns the mounting of an additional device around the laminated stack, so that the inductive contribution to the impedance is substantially increased.

Figure 6:
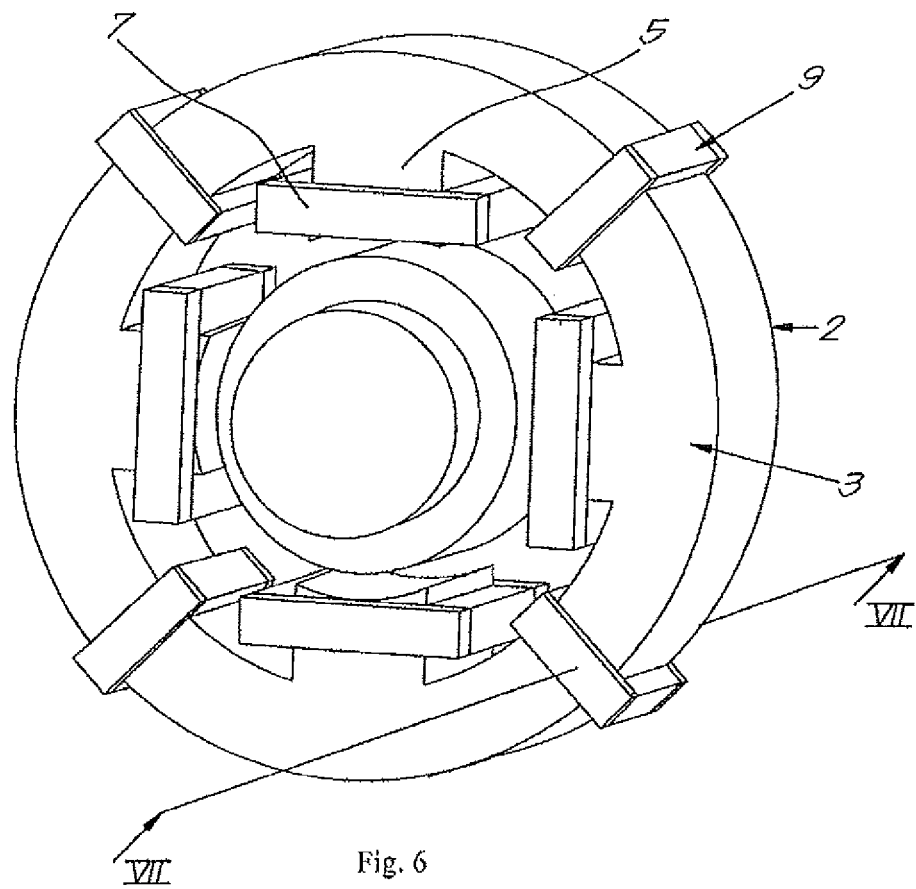
FIG. 6 schematically shows a perspective view of the part of a magnetic bearing according to the invention, that is responsible for generating radial forces.
Figure 7:
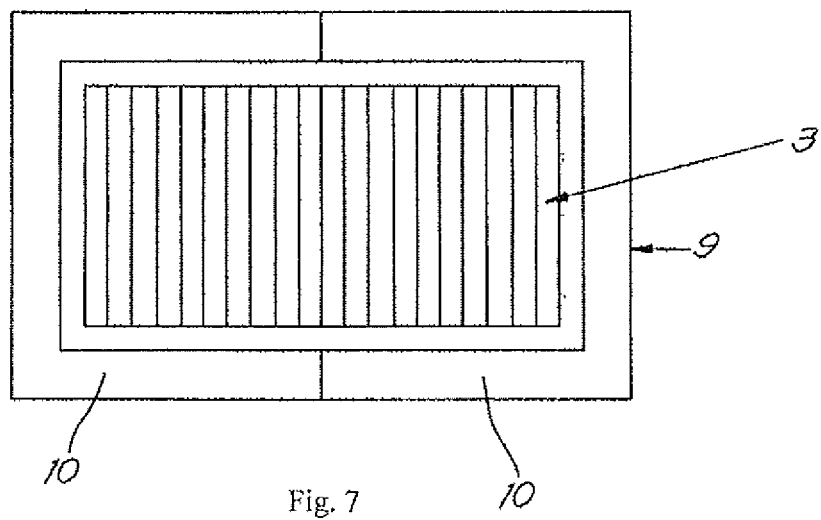
FIG. 7 shows a cross-section according to line VII-VII in FIG. 6.

According to the invention this is done in a practical way by the stator yoke being linked to a closed, ferromagnetic structure 9 that surrounds the stator yoke 3, as shown in FIG. 6.

In practice, this being "linked" means that the aforementioned ferromagnetic structure 9 in fact surrounds a part of the stator yoke 3, while the stator yoke 3 also surrounds a part of the aforementioned ferromagnetic structure 9, like two links of a chain that are linked together.

Axial cross-sections of the stator yoke 3 of the stack of laminated material with a few typical variants of surrounding hollow ferromagnetic structures 9, are shown in FIGS. 7, 10, 13 and 14.

In order to maximise the performance of this method, ideally additional measures are taken to limit or prevent the eddy currents generated in the hollow ferromagnetic structure.

This can be realised for example by assembling the hollow ferromagnetic structure 9, making use of parts 10 such as ferrite parts, soft magnetic composite parts or parts of stacked thin ferromagnetic lamellae.

Figure 8:
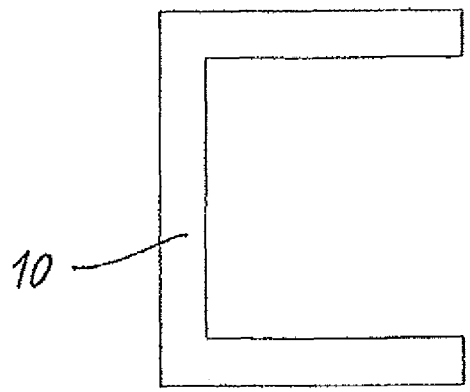
FIGS. 8 and 9 show successive steps of the assembly of a ferromagnetic structure according to FIG. 7.

In order to minimise the magnetic reluctance of the ferromagnetic structure 9 and the costs, the aforementioned parts 10 are preferably U shaped, as shown in FIG. 8.

Figure 9:
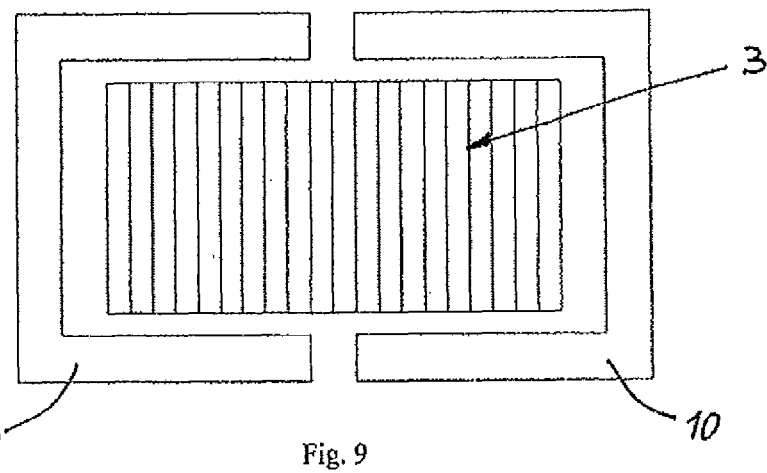
Figure 10:
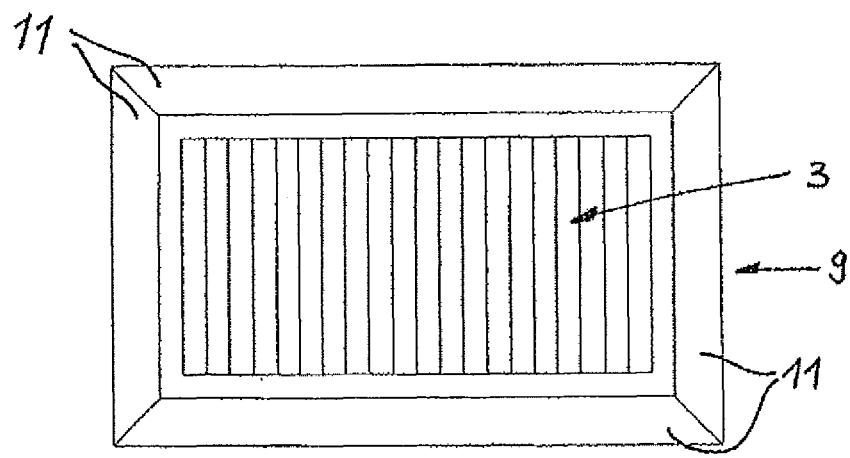
FIGS. 10, 13 and 14 show various embodiments of the yoke of the stack of laminated material according to FIG. 7.

FIG. 9 shows the way in which such U shaped parts could be mounted around the stator yoke 3. Instead of using U shaped parts 10, straight parts 11 can also be used, as shown in FIG. 11.

Figure 11:
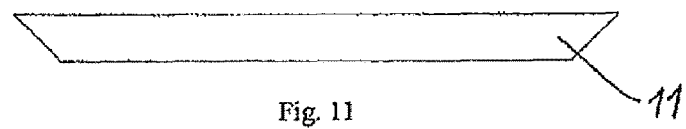
FIG. 11 shows a part of the ferromagnetic structure according to FIG. 10.
Figure 12:
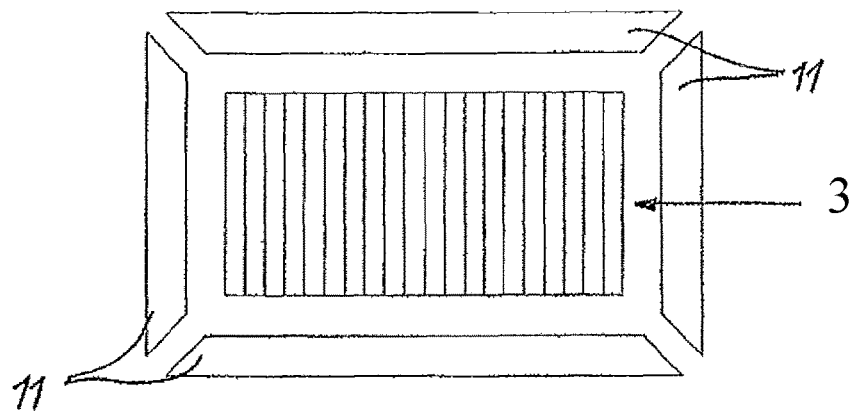
FIG. 12 shows an exploded view of the ferromagnetic structure according to FIG. 14.

FIG. 12 shows the way in which these straight parts 11 of FIG. 11 could be mounted around the stator yoke 3. In order to minimise the magnetic reluctance, it is necessary for the parts to be pressed together.

Figure 13:
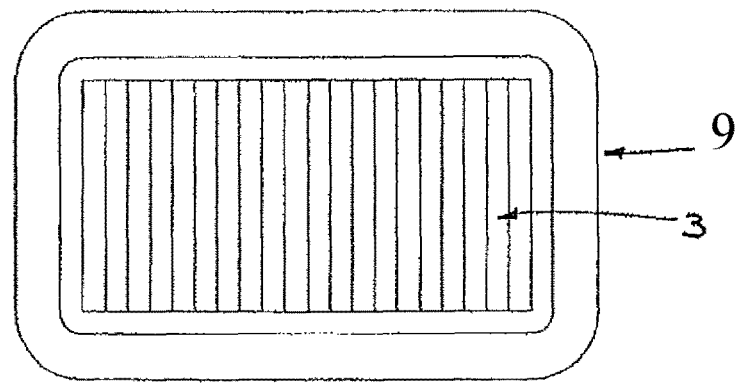
Figure 14:
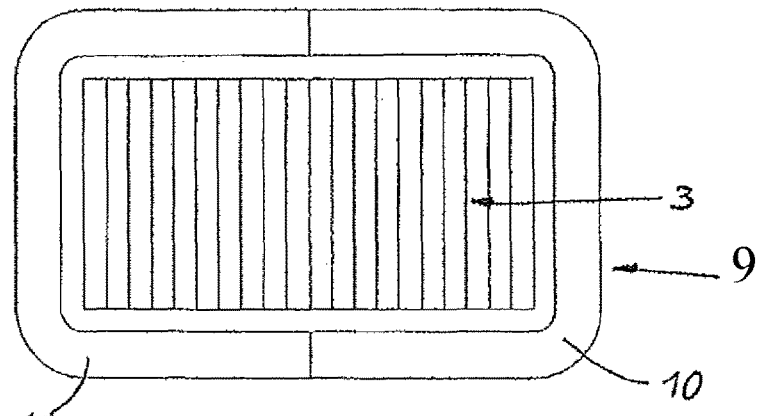

However, such a hollow ferromagnetic structure 9 could also be made by winding amorphous ribbons or nanocrystalline ribbons around the stator yoke 3 of the stack of laminated material, as shown in FIG. 13.

Figure 15:
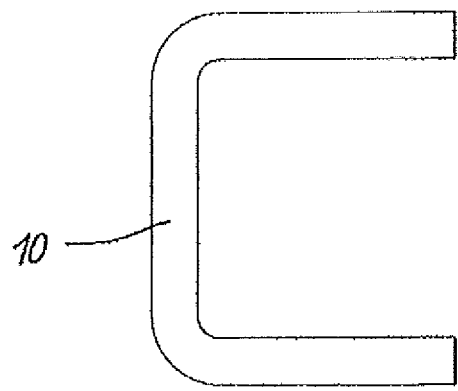
FIG. 15 shows the resulting hollow ferromagnetic structures can be divided into parts.
Figure 16:
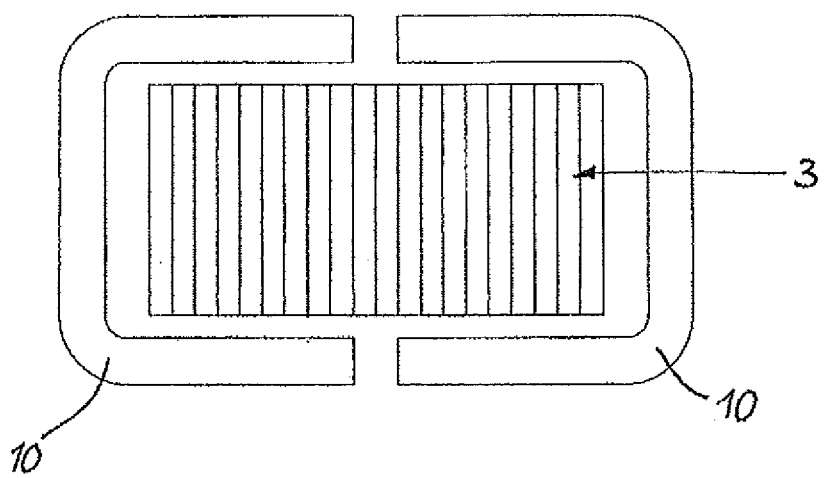
FIG. 16 shows an exploded view of the ferromagnetic structure according to FIG. 14.

Instead of winding these materials directly, these materials can also be wound on a separate structure, the resulting hollow ferromagnetic structures can be divided into parts, as shown in FIG. 15, these parts can be joined together again around the stator yoke 3 of the stack of laminated material, as shown in FIG. 16, and these parts are pressed together in order to minimise the magnetic reluctance.

The invention is by no means limited to the embodiments described above and shown in the drawings, but a magnetic bearing according to the invention can be realised in all kinds of variants, without departing from the scope of the invention.

The invention claimed is:

1. A magnetic bearing comprising a radial actuator part configured to create radial magnetic forces and an axial actuator part configured to create axial magnetic forces, wherein the aforementioned radial actuator part comprises a laminated stator stack that is provided with a stator yoke, wherein the magnetic bearing comprises at least one closed ferromagnetic structure that surrounds a part of the stator yoke, wherein the axial actuator part comprises at least one axial control coil that surrounds the laminated stator stack, and further comprises a pole yoke and two axial poles; wherein permanent magnets are provided between the stator yoke and both axial poles; the permanent magnets are magnetised in an axial direction; and the magnetisation direction of the permanent magnets is opposite at both axial sides of the stator yoke, and wherein a path of an axial control flux crosses a central hole of a stack of laminated ferromagnetic material.

2. The magnetic bearing according to claim 1, wherein the closed ferromagnetic structure comprises wound flat ribbon.

3. The magnetic bearing according to claim 1, wherein the closed ferromagnetic structure comprises a ferrite.

4. The magnetic bearing according to claim 1, wherein the closed ferromagnetic structure comprises a soft magnetic composite powder.

5. The magnetic bearing according to claim 1, wherein the closed ferromagnetic structure comprises an amorphous or nanocrystalline material.

6. The magnetic bearing according to claim 1, wherein the closed ferromagnetic structure comprises a number of interconnected parts.

* * * * *